May 31, 1949.  L. F. JAGGI  2,471,432
WAVEMETER TO CALIBRATE PANORAMIC RECEIVERS
Filed Aug. 11, 1944  2 Sheets-Sheet 1

INVENTOR.
LEWIS F. JAGGI
BY William D. Hall
ATTORNEY

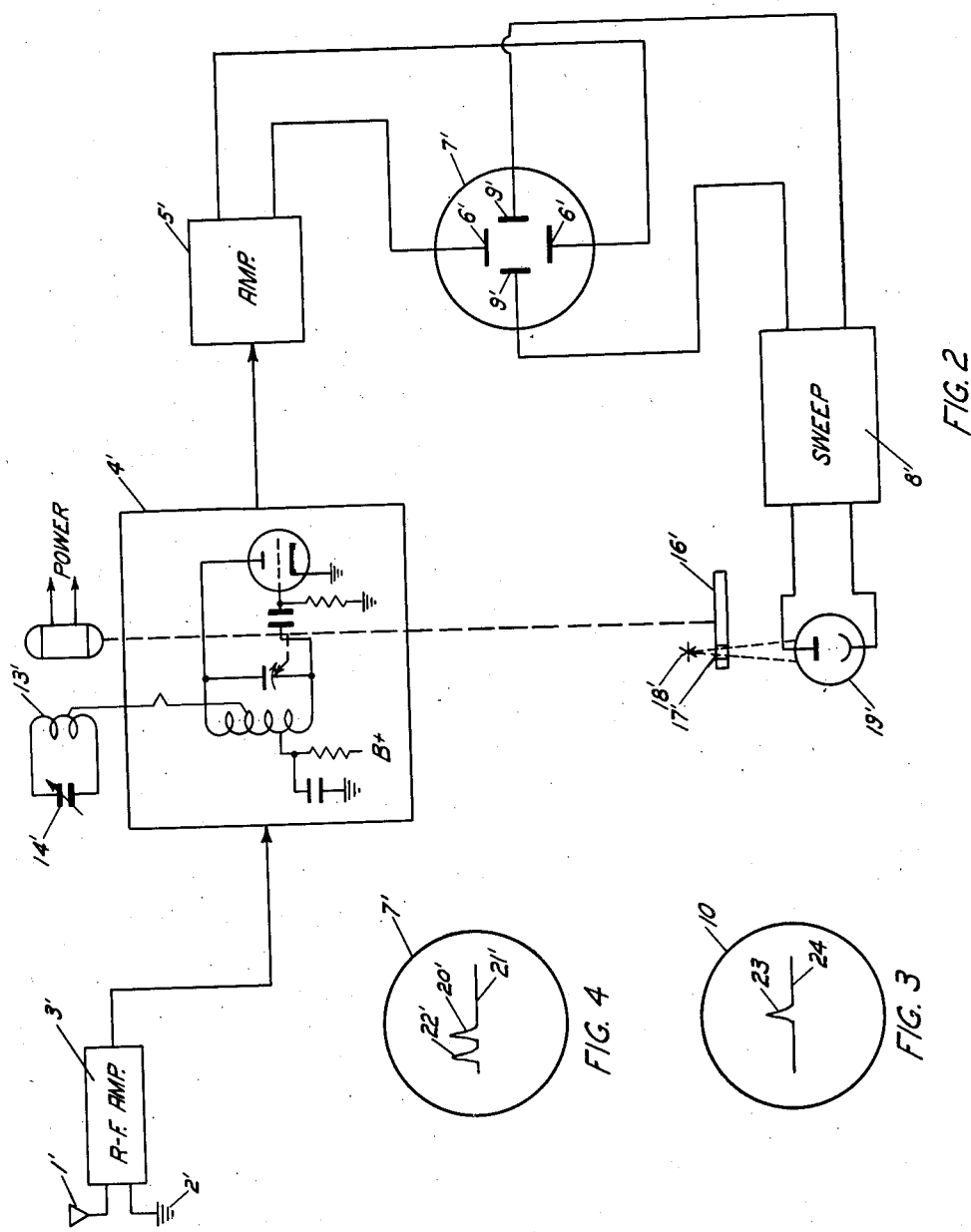

Patented May 31, 1949

2,471,432

UNITED STATES PATENT OFFICE 2,471,432

WAVEMETER TO CALIBRATE PANORAMIC RECEIVERS

Lewis F. Jaggi, Dayton, Ohio

Application August 11, 1944, Serial No. 549,083

14 Claims. (Cl. 250—39)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to frequency measuring means and more particularly to means of this type adapted for use with panoramic receivers.

In equipment such as panoramic receivers for displaying the radio spectrum over a range of frequencies, it is necessary to calibrate the screen of the cathode ray tube employed for display purposes so that an accurate visual indication of the frequency may be made. The positioning of the electron beam on a cathode ray tube varies with age of said tube and slight changes in voltages applied thereto. The replacement of one cathode ray tube by another of the same type would require recalibration of the base line for frequency presentation. It is, therefore, necessary to recalibrate the cathode ray screen very often. An oscillator could be used to furnish a signal of known frequency to calibrate the screen, but this method requires an additional tube which is undesirable from the standpoint of space and power consumption.

Applicant, with a knowledge of these objections to and defects in the prior art, has for an object of his invention the provision of a radio receiver with a relatively simple type of wavemeter incorporated therein as a permanent part of the equipment.

Applicant has as another object of his invention, the provision of, in combination with a receiver, a wavemeter which eliminates the usual indicator incorporated therein for indicating when the receiver has been tuned to the frequency of the wavemeter.

Applicant has as a further object of his invention, the provision of a wavemeter of the absorption type which will utilize the output of the receiver for indicating when such receiver is tuned to the frequency of the wavemeter.

Applicant has as a further object of his invention, the provision of a wavemeter particularly adapted for use with a panoramic receiver for providing visual indication directly upon the screen of a cathode ray display tube when the receiver is tuned to the frequency of the wavemeter and permit calibration of the cathode ray tube in frequency over the range to be covered by the tuning circuit.

Applicant has as a further object of his invention, the provision of a wavemeter for extremely accurate frequency calibration. Prior methods of frequency indication when using a wavemeter have been inaccurate since only a rough indication of resonance could be made. The actual resonance curve of the wavemeter is indicated on the screen of the panoramic receiver allowing the operator to tune the receiver for the very peak of the resonance curve.

Applicant has as a still further object of his invention the use of a wavemeter for precise frequency measurement of an unknown signal using the panoramic receiver as an indicator, since prior difficulties in the use of a wavemeter for accurate frequency measurement have been due to inability to accurately tune the wavemeter to resonance at the unknown signal frequency.

Other objects and advantages of his invention will appear from the following specification and the accompanying drawings, and the novel features thereof will be particularly pointed out in the annexed claims.

In the drawings,

Fig. 2 is a schematic diagram of my invention applied to a superregenerative detector panoramic receiver.

Fig. 3 shows the screen of the cathode ray tube of Fig. 1.

Fig. 4 shows the screen of the cathode ray tube of Fig. 2.

Figure 1:
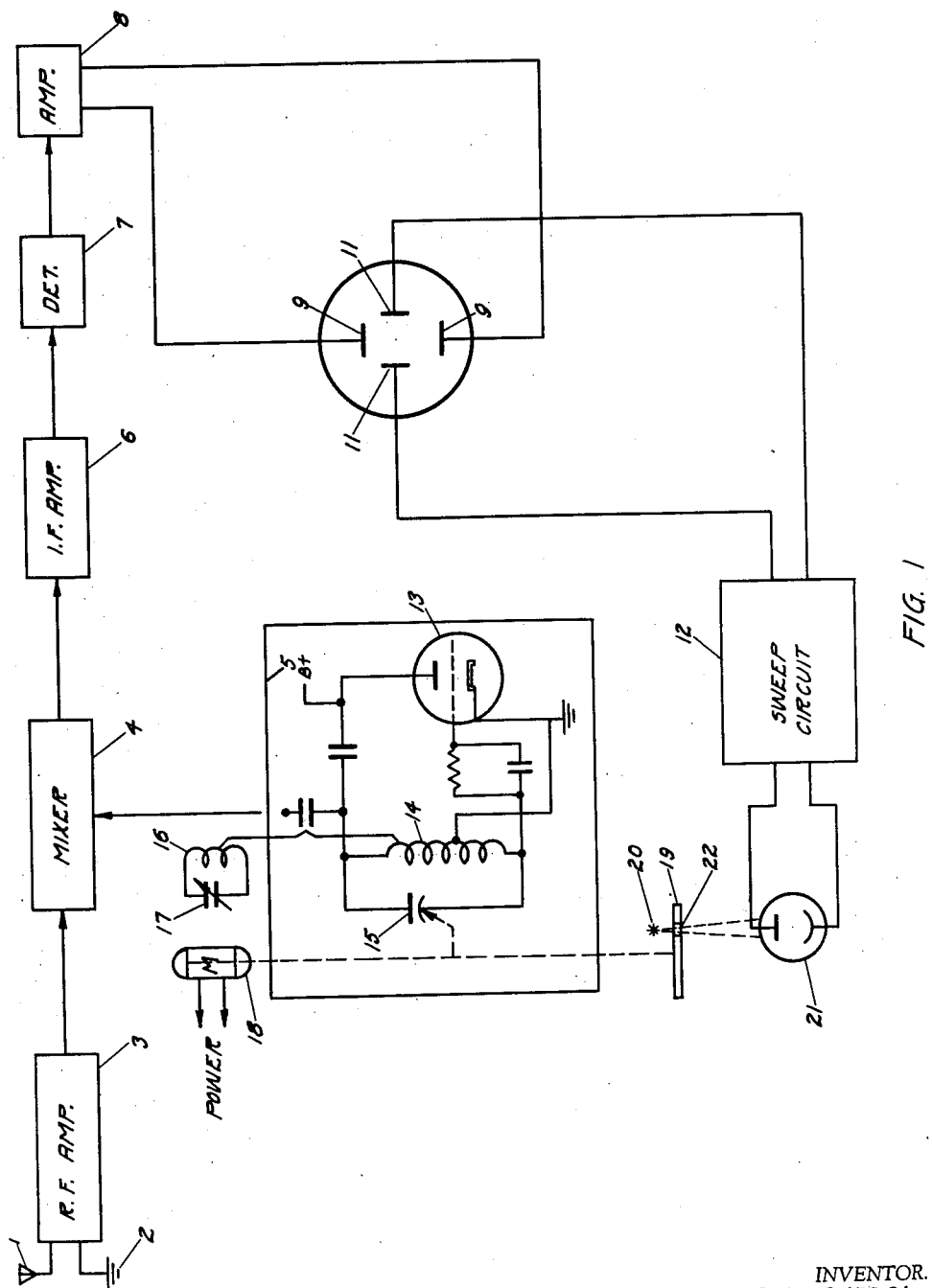
Fig. 1 is a schematic showing of my new invention applied to a superheterodyne receiver.

Referring to the drawings in detail and particularly to Fig. 1, the conventional antenna 1 and ground 2 feed into the usual R. F. stage or stages 3 of a superheterodyne receiver. These, in turn, feed into a mixer 4 and beat against the oscillations of a local oscillator 5 to produce the usual intermediate frequency which is, in turn, fed to the I. F. amplifier 6 and into the conventional detector 7. The output of detector 7 is then passed through an audio or video frequency amplifier 8 of conventional construction, and from there the output is fed to the vertical plates 9, of a cathode ray tube 10, of any conventional construction.

The horizontal plates 11, 11 of the cathode ray tube 10 are acted upon by sweep circuit 12 which impresses a saw-tooth wave on these plates in synchronism with the tuning of the oscillator circuit of local oscillator 5 across the range of frequencies representing the radio spectrum of the receiver covered by the tuning as described more in detail hereinafter.

The oscillator circuit of oscillator 5 is conventional with oscillator tube 13 and inductance and condenser circuit 14, 15 connected in the usual manner. However, the wavemeter circuit is incorporated therein with inductance 16 being inductively coupled to inductance 14, as indicated by the bracket between said inductances, condenser 17 serving to tune the wavemeter circuit to resonance.

To synchronize a receiver with the sweep, a motor 18 operates the tuning element of condenser 15. The motor 18 also rotates disc 19 at a uniform speed moving slit 22 which is preferably narrow, into the line of light between light source 20 and photo-electric tube 21, permitting light to fall upon the tube 21 which feeds into and synchronizes the operation of a sweep circuit 12 creating saw-tooth pulses that control the sweep of the cathode ray tube in synchronism with the tuning sweep of the radio receiver in a manner similar to that described in the co-pending application of Jaggi et al., Serial Number 576,100, filed Feb. 3, 1945.

When condenser 17 of the wavemeter is set for a predetermined frequency of resonance with its inductance 16, within the tuning range of L. C. circuit 14, 15, and when the condenser 15 is tuned by motor 18 until the local oscillator circuit 14, 15 corresponds to that frequency, energy in increased amount is transferred to the wavemeter circuit 16, 17 due to its resonance. The absorption of this energy by the wavemeter circuit constitutes a sufficient load on the oscillator circuit 14, 15 to cause it to cease oscillating or to change amplitude of the oscillator output to an extent sufficient to cause a decrease in amplitude of a signal on the screen of the cathode ray tube. Knowing the frequency of wavemeter circuit 16, 17 by taking the condenser setting which is properly calibrated in frequency or other convertible quantity, the frequency of said signal on the screen is represented by the following formula:

Signal frequency = Oscillator frequency — I. F. frequency

The calibration on the dial of condenser 17 represents the oscillator frequency since the wavemeter circuit is tuned to that frequency, while the I. F. frequency is a fixed known quantity. With a series of settings of the dial of condenser 17, the base line of the screen of the cathode ray tube may be calibrated in signal frequency by using the above formula.

Referring to another modification of my invention as disclosed in Fig. 2 and whose circuit is described in detail in the above-cited co-pending application, 1' and 2' are conventional antenna and ground which feed into untuned R. F. stage 3' used for the purpose of isolating superregenerative detector 4' from the antenna 1' to reduce interference effects caused by oscillations of the superregenerative detector 4'. Detector 4' feeds into amplifier 5' and on to the vertical plates 6' of cathode ray tube 7'. The amplifier 5' may be an audio or video amplifier. Sweep circuit 8' feeds into the horizontal plates 9' of cathode ray tube 7'.

The detector circuit 4' is similar to that disclosed in the above-cited application, and includes an inductance and variable condenser for tuning purposes. In addition, a wavemeter circuit is provided including inductance 13' and condenser 14', with inductance 13' being inductively coupled to inductance 12'.

Condenser 11' is operated by motor 15' which, in turn, operates or rotates disc 16' having a slot 17' therein in line between light source 18' and photo-electric light sensitive tube 19' to periodically permit light to pass from source 18' and impinge upon photo tube 19' for synchronizing the receiver tuning and the cathode ray sweep as described in connection with Fig. 1.

The setting of condenser 14' so that wavemeter circuit 13', 14' is tuned to a predetermined frequency of resonance, results in transfer or absorption of sufficient energy from the detector circuit 4' to throw it out of oscillation or change its output when tuned to the frequency of resonance to the wavemeter circuit by condenser 11'. This produces a pip on the screen of the scope 7'. In this circuit the frequency of the wavemeter circuit 13', 14' is the same as the signal frequency of the receiver and of the displayed pip so that the base line of the screen of the cathode ray tube 7' may be calibrated directly in frequency from the wavemeter settings without resort to formulae.

The I. F. mentioned in the foregoing equation should preferably be low. A receiver having a wide band I. F. amplifier, designed to pass frequencies in the range of 20 kc. to 500 kc. has been found to be preferable for this purpose.

Having thus described my invention, I claim:

1. In a tunable receiver including a tunable self-oscillating circuit to determine the response frequency of said receiver, and an indicator coupled to the output of said receiver for translating a signal to which said receiver is tuned; the combination therewith of means for accurately indicating the frequency of said signal comprising a power-absorbing circuit coupled to said self-oscillating circuit and tunable over the same frequency range as said self-oscillating circuit, said power-absorbing circuit being calibrated in frequency, the degree of coupling between said circuits being such that the amplitude of the output of said self-oscillating circuit is materially reduced when both circuits are tuned to the same frequency.

2. The combination set forth in claim 1, wherein said receiver is a superheterodyne receiver and wherein said self-oscillating circuit is the local oscillator thereof.

3. The combination set forth in claim 1, wherein said receiver is a heterodyne receiver and wherein said self-oscillating circuit is the local oscillator thereof.

4. The combination set forth in claim 1, wherein said self-oscillating circuit is a superregenerative detector.

5. The combination set forth in claim 1, wherein said degree of coupling is sufficient to prevent said self-oscillating circuit from oscillating when both circuits are tuned to the same frequency.

6. In a receiver system including a tunable superregenerative detector circuit to determine the response frequency of said receiver, and an indicator coupled to the output of said detector for translating a signal to which said detector is tuned; the combination therewith of means for accurately indicating the frequency of said signal comprising a power-absorbing circuit coupled to said superregenerative detector circuit and tunable over the same frequency range, said power-absorbing circuit being calibrated in frequency, the degree of said coupling between said circuits being close enough to prevent said superregenerative detector circuit from oscillating when both circuits are tuned to the same frequency, thereby producing a change in the indication of a received signal.

7. A panoramic system comprising a receiver having a tunable self-oscillating circuit for determining the response frequency of said receiver, a cathode ray oscilloscope, means for producing a periodic variation in the tuning of said circuit, means for periodically deflecting the beam of said cathode ray oscilloscope in synchronism with said periodic variation to provide a trace on the screen of said cathode ray oscilloscope, and means coupled to the output of said receiver for indicating on said trace signals to which said receiver is responsive; the combination therewith of means for accurately indicating the frequency of a signal indicated by said oscilloscope, said last-named means comprising a power-absorbing circuit coupled to said self-oscillating circuit, calibrated means to tune said power-absorbing circuit over a frequency range equal to that of said self-oscillating circuit, the degree of coupling between said circuits being close enough to materially reduce the output of said self-oscillating circuit when both of said circuits are tuned to the same frequency.

8. The combination set forth in claim 7, wherein said receiver is a superheterodyne receiver and wherein said self-oscillating circuit is the local oscillator thereof.

9. The combination set forth in claim 7, wherein said receiver is a heterodyne receiver and wherein said self-oscillating circuit is the local oscillator thereof.

10. The combination set forth in claim 7, wherein said self-oscillating circuit is a superregenerative detector.

11. The combination set forth in claim 7, wherein said degree of coupling is sufficient to prevent said self-oscillating circuit from oscillating when both circuits are turned to the same frequency.

12. A panoramic system comprising a superheterodyne receiver having a local oscillator circuit for determining the response frequency of said receiver, a cathode ray oscilloscope, means for producing a periodic variation in the frequency of said local oscillator circuit, means for periodically deflecting the beam of said cathode ray oscilloscope in synchronism with said periodic variation to provide a trace on the screen of said oscilloscope, means coupled to the output of said receiver for producing spaced variations of said trace to provide spaced indications of signals of different frequencies to which said receiver is tuned; the combination therewith of means for accurately indicating the frequency of a signal indicated by said oscilloscope, said last-named means comprising a power-absorbing circuit coupled to said oscillator circuit, calibrated means to tune said power-absorbing circuit over a frequency range equal to that of said local oscillator circuit, the degree of coupling between said circuits being close enough to prevent said oscillator from oscillating when both circuits are tuned to the same frequency.

13. A panoramic system comprising a receiver having a superregenerative detector circuit for determining the response frequency of said receiver, a cathode ray oscilloscope, means for producing a periodic variation in the frequency of said superregenerative detector circuit, means for periodically deflecting the beam of said cathode ray oscilloscope in synchronism with said periodic variation to provide a trace on the screen of said oscilloscope, means coupled to the output of said receiver for producing deflections of said trace to provide spaced indications of signals of different frequencies to which said detector is successively tuned; the combination therewith of means for accurately indicating the frequency of a signal indicated by said oscilloscope, said last-named means comprising a power-absorbing circuit coupled to said detector circuit, calibrated means to tune said power-absorbing circuit over a frequency range equal to that of said detector circuit, the degree of coupling between said circuits being close enough to prevent said superregenerative detector circuit from oscillating when both circuits are tuned to the same frequency.

14. A panoramic system comprising a receiver having a superregenerative detector circuit for determining the response frequency of said receiver, a cathode ray oscilloscope, means for producing a periodic variation in the frequency of said superregenerative detector circuit, means for periodically deflecting the beam of said cathode ray oscilloscope in synchronism with said periodic variation to provide a trace on the screen of said oscilloscope, means coupled to the output of said receiver for producing spaced variations of said trace to indicate signals of different frequencies to which said detector is successively tuned; the combination therewith of means for accurately calibrating said trace, said last-named means comprising a power-absorbing circuit coupled to said detector circuit, calibrated means to tune said power-absorbing circuit over a frequency range equal to that of said detector circuit, the degree of coupling between said circuit being close enough to prevent said superregenerative detector circuit from oscillating when both circuits are tuned to the same frequency.

LEWIS F. JAGGI.

REFERENCES CITED

The following references are of record in the file of this patent:

UNITED STATES PATENTS

| Number | Name | Date |
|---|---|---|
| 1,853,953 | Becker | Apr. 12, 1932 |
| 1,947,182 | Betts | Feb. 13, 1934 |
| 1,982,340 | Forbes | Nov. 27, 1934 |
| 1,994,232 | Schuck, Jr. | Mar. 12, 1935 |
| 2,070,958 | Peterson | Feb. 16, 1937 |
| 2,131,559 | Granger | Sept. 27, 1938 |
| 2,159,790 | Freystedt et al. | May 23, 1939 |
| 2,178,074 | Jakel et al. | Oct. 31, 1939 |
| 2,187,865 | Potter | Jan. 23, 1940 |
| 2,218,923 | Newhouse | Oct. 22, 1940 |
| 2,243,234 | Von Duhn | May 27, 1941 |
| 2,252,058 | Bond | Aug. 12, 1941 |
| 2,272,768 | Crosby | Feb. 10, 1942 |
| 2,321,315 | Peterson et al. | June 8, 1943 |